United States Patent
Huang et al.

(10) Patent No.: US 10,678,232 B2
(45) Date of Patent: Jun. 9, 2020

(54) PROGNOSTIC METHOD AND APPARATUS FOR A PROCESSING APPARATUS

(71) Applicant: INDUSTRIAL TECHNOLOGY RESEARCH INSTITUTE, Hsinchu (TW)

(72) Inventors: Po-Yu Huang, Tainan (TW); Chuang-Hua Chueh, Taipei (TW)

(73) Assignee: INDUSTRIAL TECHNOLOGY RESEARCH INSTITUTE, Chutung, Hsinchu (TW)

(*) Notice: Subject to any disclaimer, the term of this patent is extended or adjusted under 35 U.S.C. 154(b) by 407 days.

(21) Appl. No.: 15/618,772

(22) Filed: Jun. 9, 2017

(65) Prior Publication Data
US 2018/0210991 A1    Jul. 26, 2018

(30) Foreign Application Priority Data

Jan. 20, 2017   (TW) .............................. 106102148 A

(51) Int. Cl.
G05B 23/02   (2006.01)

(52) U.S. Cl.
CPC ............................... G05B 23/0283 (2013.01)

(58) Field of Classification Search
None
See application file for complete search history.

(56) References Cited

U.S. PATENT DOCUMENTS

| 6,594,589 | B1 | 7/2003 | Coss, Jr. et al. |
| 6,616,759 | B2 | 9/2003 | Tanaka et al. |
| 6,714,884 | B2 | 3/2004 | Dor et al. |
| 2009/0240366 | A1* | 9/2009 | Kaushal ............. G05B 13/0265 700/110 |

(Continued)

FOREIGN PATENT DOCUMENTS

| CN | 1791971 A | 6/2006 |
| CN | 101066742 A | 11/2007 |

(Continued)

OTHER PUBLICATIONS

Lee et al. "Reconfigurable informatics platform for rapid prognostic design and implementation: tools and case studies", Jan. 2013,Proceedings of MFPT 2013, 21 pages. (Year: 2013).*

(Continued)

*Primary Examiner* — Suzanne Lo
(74) *Attorney, Agent, or Firm* — Muncy, Geissler, Olds & Lowe, P.C.

(57) ABSTRACT

A prognostic method and a prognostic apparatus for a processing apparatus are provided. In the steps of the prognostic method, multiple sensor data of a component of the processing apparatus and a heterogeneous data are obtained, multiple health indicators of the component are obtained by the multiple sensor data, a regressive characteristic function and an adjustment function are obtained according to the health indicators, the adjustment function corresponds to the heterogeneous data, a prediction function of health indicator is obtained according to the regressive (Continued)

characteristic function and the adjustment function, and a predictive value of health indicator is obtained according to the prediction function of health indicator to estimate a usage status of the component.

20 Claims, 3 Drawing Sheets

(56) References Cited

U.S. PATENT DOCUMENTS

| | | | |
|---|---|---|---|
| 2009/0282296 A1 | 11/2009 | Lin | |
| 2015/0160098 A1* | 6/2015 | Noda | G05B 23/024 |
| | | | 702/35 |
| 2016/0091393 A1* | 3/2016 | Liao | B23Q 17/0995 |
| | | | 702/34 |
| 2017/0132387 A1 | 5/2017 | Lin et al. | |
| 2017/0132910 A1 | 5/2017 | Chen et al. | |
| 2017/0276720 A1 | 9/2017 | Hsu et al. | |
| 2017/0296965 A1* | 10/2017 | Schaeffer | G05B 19/406 |

FOREIGN PATENT DOCUMENTS

| | | |
|---|---|---|
| CN | 101413991 A | 4/2009 |
| CN | 101025804 B | 7/2012 |
| CN | 103648827 A | 3/2014 |
| CN | 102016730 B | 6/2014 |
| CN | 105241680 A | 1/2016 |
| CN | 105571638 A | 5/2016 |
| TW | I240881 B | 10/2005 |
| TW | 201629919 A | 8/2016 |
| TW | I549075 B | 9/2016 |
| TW | I570587 B | 2/2017 |
| TW | I571759 B | 2/2017 |

OTHER PUBLICATIONS

Eker et al. "Filter Clogging Data Collection for Prognostics" 2013, Annual Conference of the Prognostics and Health Management Society, 9 pages. (Year: 2013).*
Eker et al. "Physics-based prognostic modelling of filter clogging phenomena", Jun. 15, 2016, Mechanical Systems and Signal Processing vol. 75, pp. 395-412. (Year: 2016).*
J. Lee et al; "Development of a Predictive and Preventive Maintenance Demonstration System for a Semiconductor Etching Tool"; ECS Transactions, 2013; 52 (1) pp. 913-927.
Thanyalak Chalermarrewong et al; "Failure Prediction of Data Centers Using Time Series and Fault Tree Analysis"; 2012 IEEE 18th International Conference on Parallel and Distributed Systems; 2012; pp. 794-799.

* cited by examiner

PROGNOSTIC METHOD AND APPARATUS FOR A PROCESSING APPARATUS

CROSS-REFERENCE TO RELATED APPLICATIONS

This non-provisional application claims priority under 35 U.S.C. § 119(a) on Patent Application No(s). 106102148 filed in Taiwan, R.O.C. on Jan. 20, 2017, the entire contents of which are hereby incorporated by reference.

TECHNICAL FIELD

The present application relates to a prognostic method and a prognostic apparatus for a processing apparatus.

BACKGROUND

According to research reports, manufacturing will be one of the top 5 big data markets in 2020. The failure of the important equipment is the main factor to influence the operation of a company. The operation effectiveness of a company could be improved by analyzing the failure of the important equipment.

Normally, analyzing failure of the important equipment is according to the data of the sensors which monitor and evaluate the health status of the processing apparatus or the components of the processing apparatus. The maintenance of the processing apparatus or replacing the components of the processing apparatus is according to the health status. The unexpected downtime and the maintenance frequency could be reduced.

In the future, the trend of production for a processing apparatus is small-volume, but with multiple product types. The existing technologies for prognostic and health management of processing apparatus could not provide for such a trend of small-volume production with multiple product types. There is need for an accurate prognostic technology of predicting the health changes of the processing apparatus.

SUMMARY

One exemplary embodiment of the present disclosure relates to a prognostic method for a processing apparatus. The prognostic method obtains multiple sensor data of a component of the processing apparatus and a heterogeneous data of the processing apparatus, obtains multiple health indicators of the component according to the multiple sensor data, obtains a regressive characteristic function and an adjustment function according to the multiple health indicators and the heterogeneous data, wherein the adjustment function corresponds to the heterogeneous data, and the prognostic method obtains a prediction function of health indicator according to the regressive characteristic function and the adjustment function, and obtains a predictive value of health indicator according to the prediction function of health indicator to estimate a usage status of the component.

Another exemplary embodiment of the present disclosure relates to a prognostic apparatus. The apparatus includes a data module to obtain multiple sensor data of a component of a processing apparatus and a heterogeneous data of the processing apparatus, a health indicator module to obtain multiple health indicators of the component according to the multiple sensor data, an adjustment module to obtain a regressive characteristic function and an adjustment function according to the multiple health indicators and the heterogeneous data, wherein the adjustment function corresponds to the heterogeneous data, and a prediction function of health indicator is obtained according to the regressive characteristic function and the adjustment function, and a failure prediction module to obtain a predictive value of health indicator according to the prediction function of health indicator to estimate a usage status of the component.

The foregoing will become better understood from a careful reading of a detailed description provided herein below with appropriate reference to the accompanying drawings.

DETAILED DESCRIPTION OF EXEMPLARY EMBODIMENTS

Figure 1:
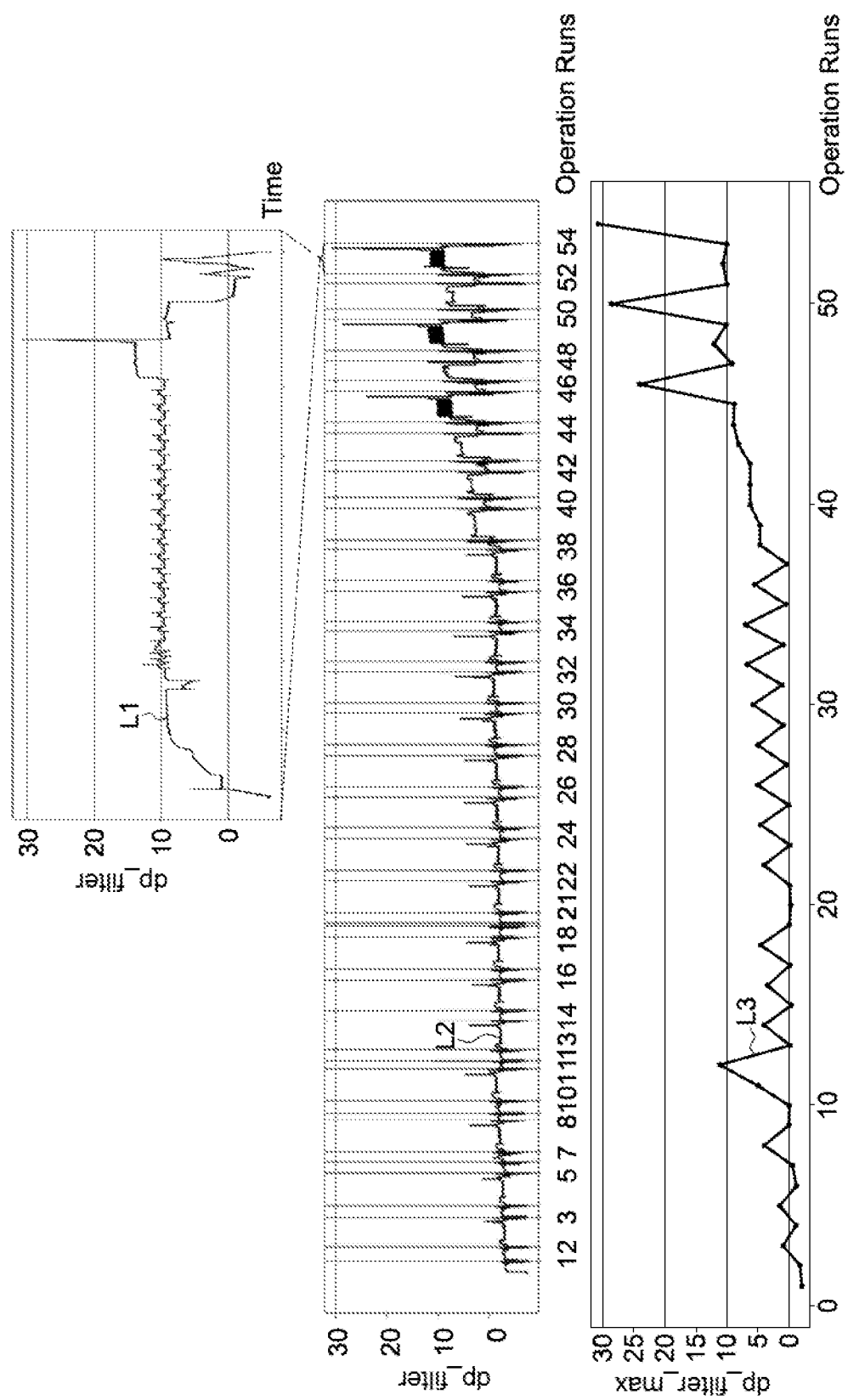
FIG. 1 is a diagram illustrating sensing curves of a Metal Organic Chemical Vapor Deposition (MOCVD) apparatus, according to an exemplary embodiment.

Below, exemplary embodiments will be described in detail with reference to accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

FIG. 1 is a block diagram illustrating sensing curves of a Metal Organic Chemical Vapor Deposition (MOCVD) apparatus, according to an exemplary embodiment. In FIG. 1, a sensing curve L1 illustrates the sensor data (dp_filter) which are collected by a particle filter executing an operation run. While the maximum value of these sensor data is greater than a threshold (for example, 30), it means that the particle filter should be replaced. A curve L2 in FIG. 1 illustrate the sensor data in a life cycle between the particle filter after being renewed and the malfunction thereof being broken. There could be many operation runs for a particle filter in one life cycle. A curve L3 in FIG. 1 illustrates the maximum value of these sensor data (dp_filter_max) in each run. For example, the health indicator of a run may be defined as the maximum value of these sensor data (dp_filter_max) in the run.

The next-run failure prediction for a particle filter of the Metal Organic Chemical Vapor Deposition (MOCVD) apparatus is to predict whether the correspondence health indicator of the particle filter of the MOCVD apparatus in a certain operation run of the future operation runs will be greater than the aforesaid threshold or not. If the health indicator is greater than the threshold, then the particle filter should be replaced owing to possible malfunctions. Or, which operation run of the future operation runs may be predicted, wherein the corresponding health indicator of the particle filter of the MOCVD apparatus in the predicted operation run will be greater than the aforesaid threshold and the particle filter of the MOCVD apparatus should be replaced owing to possible malfunctions.

Figure 2:
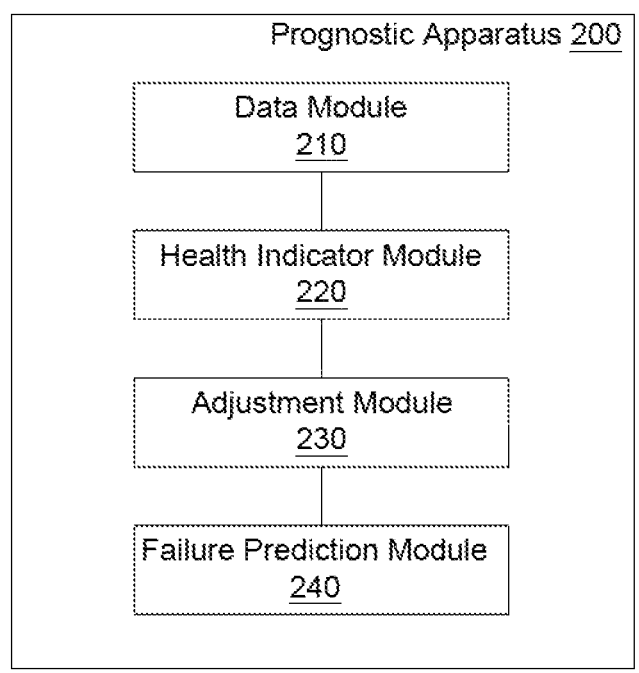
FIG. 2 is a diagram illustrating a prognostic apparatus, according to an exemplary embodiment.
Figure 3:
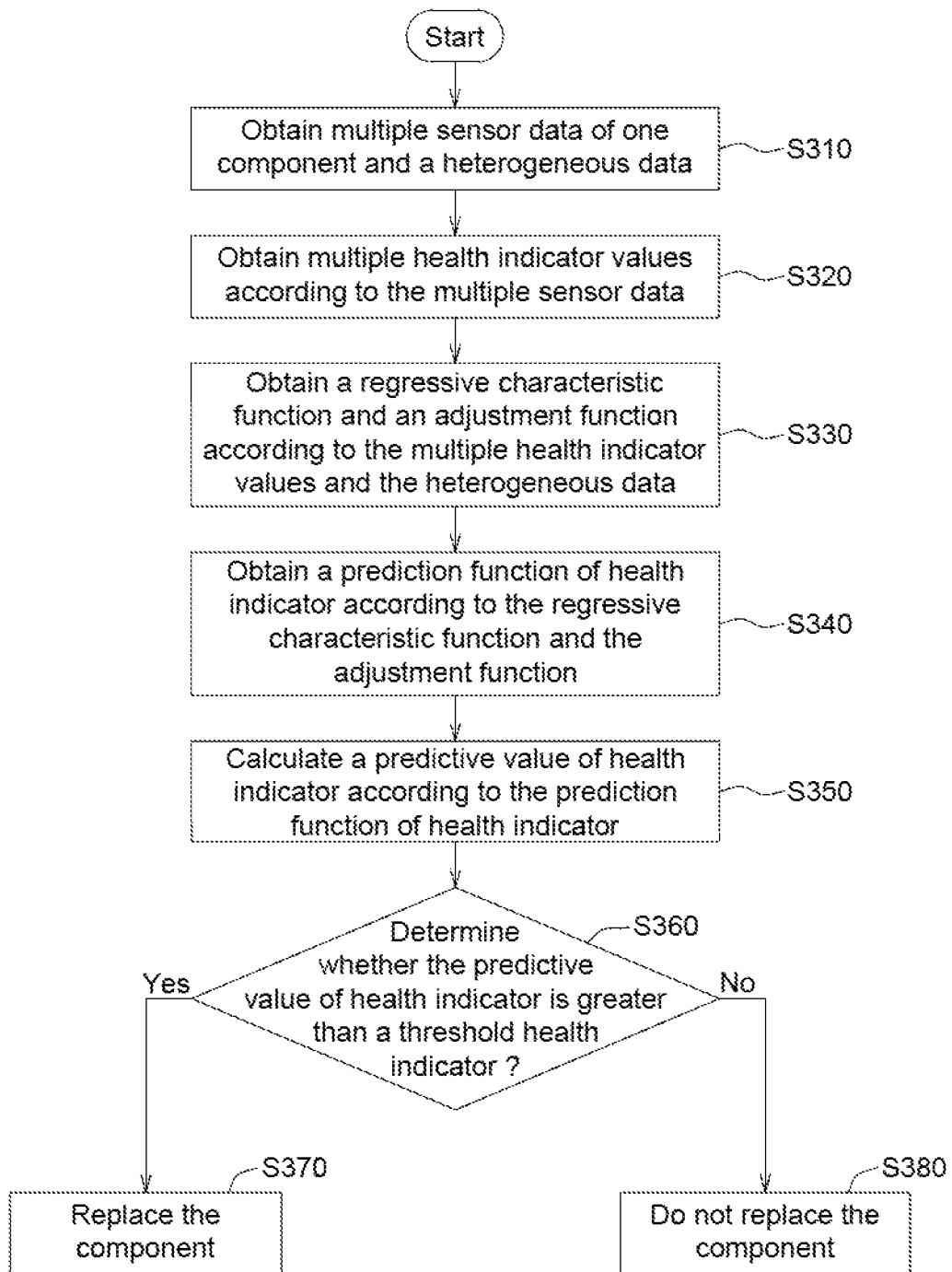
FIG. 3 is a flow diagram illustrating a prognostic method for a processing apparatus, according to an exemplary embodiment.

Please refer to FIG. 2 and FIG. 3. FIG. 2 is a prognostic apparatus, according to an exemplary embodiment. FIG. 3 is a flow diagram illustrating a prognostic method for a processing apparatus, according to an exemplary embodiment.

The prognostic apparatus 200 includes a data module 210, a health indicator module 220, an adjustment module 230, and a failure prediction module 240. The data module 210 is used to obtain data. The health indicator module 220 is used to obtain health indicators according to data. The adjustment module 230 is used to establish the relationship between different recipe types and health indicator adjusted value. The failure prediction module 240 is used to calculate the predictive value of health indicator. The data module 210, the health indicator module 220, the adjustment module 230, and the failure prediction module 240 could be realized by using a chip, a circuit in a chip, a firmware, a circuit board including multiple components and connections, or a storage medium storing multiple programming codes, or could be realized by such as a computer system, a server, and electric devices executing corresponding software or programs.

In step 310, the data module 210 could obtain multiple sensor data of one component from a processing apparatus and a heterogeneous data of the processing apparatus via reading a file, the interface of a data accessing card (not illustrated on FIG. 2), or a database (not illustrated on FIG. 2), The processing apparatus could be a semiconductor processing apparatus, for example, a Metal Organic Chemical Vapor Deposition (MOCVD) apparatus. The component could be at least one sensor, for example, a particle filter. The multiple sensor data could have the data recorded by the sensor of the component.

In one embodiment of this disclosure, the heterogeneous data includes multiple recipe type data. The multiple recipe type data correspond to multiple recipe types. Different recipe types correspond to different processing parameters. Different recipe types correspond to different processing products. For example, processing apparatus could use different recipe types to generate Light Emitting Diodes (LED) emitting different colors, respectively. Different recipe types may correspond to different processing materials and processing conditions. Therefore, during a processing with different recipe types, a component could have different degrees of damage. That means that some recipe types could cause much damage to the component, while other recipe types could cause less damage to the component.

In addition to the aforesaid multiple recipe type data, the heterogeneous data also represents external factors that could generate changes or cause different degrees of damage to the sensor data or to the processing apparatus. For example, the heterogeneous data includes a processing factor (for example, a product type), an operation factor (for example, operation method, operation steps, operators), and a factor of maintenance or repair (for example, a maintenance way or a repair way). In other words, when different operation runs correspond to different processing factors, operation factors, and maintenance or repair factors, the degrees of damage of components of the processing apparatus could be different.

In step S320, the health indicator module 220 could obtain multiple health indicator values according to the multiple sensor data. The multiple sensor data are the sensor data of the component during the processing in the multiple operation runs. Each of operation runs correspond to multiple sensor data. The multiple health indicator values could be calculated via formula or model, or captured directly from the value of the sensor data. For example, the health indicator value of the component in each operation run could be the maximum value of the multiple sensor data collected during each run. For example, the curve L3 shown in FIG. 1 illustrates the maximum value of the multiple sensor data in each operation run, which is used to represent the health indicator value corresponding to this operation run.

In step S330, the adjustment module 230 obtains a regressive characteristic function and an adjustment function according to the multiple health indicator values and the heterogeneous data. The adjustment function relates to the heterogeneous data. For example, different recipe types correspond to different adjusted value. The processing with different recipe types cause different degrees of damage to the component. Therefore, the health indicator value of the component need be adjusted according to different recipe types during the processing. That is, the adjustment function provides different recipe types with different adjusted values.

The multiple health indicator values of the multiple sensor data of the component correspond to multiple operation runs, respectively. Each of the multiple operation runs corresponds respectively to an operation run index value (i), i is a positive integer. For each operation run index value (i), the regressive characteristic function and the adjustment function are the regressive characteristic function and the adjustment function, respectively, which could minimize the error between the prediction function of health indicator and the health indicator value corresponding to the operation cycle index value (i). The aforesaid regressive characteristic function may be a time series model or a curve fitting model.

The following shows the example on how to calculate the regressive characteristic function and the adjustment function. Wherein, $(x_i, r_i)$ represents training data with N records (i=1~N) of different operation runs. i represents the operation run index value corresponding to different operation runs. N is a positive integer. $x_i$ is an i-th health indicator value after an i-th operation run is measured by the sensor. $r_i$ is an i-th recipe type used in the i-th operation run. This example shows that the heterogeneous data is taken as recipe type data. This example is also applicable to heterogeneous data of other types.

Now, the adjustment function corresponding to the health indicator would be defined as following. The adjustment function is g(r).

$$g(r) = \begin{cases} d_1, & \text{if } r = type_1 \\ \vdots & \vdots \\ d_R, & \text{if } r = type_R \end{cases} = \sum_{k=1}^{R} d_k \delta(r = type_k)$$

$\delta(\bullet)$ is an indicator function. $d_k$ corresponds to the value of different recipe types. R is a positive integer. $type_k$ represents different recipe types. If the heterogeneous data is continuous, a function could be defined to describe the relationship between the heterogeneous data and the correction value. For example, the function with a model parameter $\theta$ could be defined as $y_i = f_\theta(i)$. According to the relationship among the health indicator, the adjustment function, and the regressive characteristic function, a preferred objective function could be established. For example, assume that after the health indicator value subtracts the adjusted value, the health indicator has stable regressive characteristic. That is, the relationship among the health indicator, the adjustment function, and the regressive characteristic function is $x_i \approx g(r_i) + f_\theta(i)$. According to the above relationship, the preferred objective function T could be $$\frac{1}{2} \sum_{i=1}^{N} [x_i - (g(r_i) + f_\theta(i))]^2.$$

The T could be calculated by Minimum Square Error method (MSE).

The following would describe how to solve the equation. $d_1, d_2, \ldots, d_R$ could be initialized in advance, and the $\theta$ could be initialized, too. After $\hat{g}$ is given, the training data $\{x_i-g(r_i), i=1\sim N\}$ could be used to update $\theta$ by the MSE based on the regressive characteristic. The $$\min_\theta \left\{ \sum_{i=1}^N [(x_i - \hat{g}(r_i)) - f_\theta(i)]^2 \right\}$$

could be obtained. After $\hat{f}$ is given, the training data $\{x_i-\hat{f}_\theta(i), i=1\sim N\}$ could be used to update $g(r_i)$ by an optimization procedure based on the numerical method. The $$\min_\theta \left\{ \sum_{i=1}^N [(x_i - \hat{f}_\theta(i)) - g(r_i)]^2 \right\}$$

could be obtained. Repeating the above steps, the regressive characteristic function $\hat{f}$ and the adjustment function $\hat{g}$ could be obtained.

In step S340, the adjustment module 230 could obtain the prediction function of health indicator according to the regressive characteristic function and the adjustment function. For example, the prediction function of health indicator could be the sum of the regressive characteristic function and the adjustment function.

In step S350, the failure prediction module 240 calculates a predictive value of health indicator according to the prediction function of health indicator, to estimate the usage status of the component. In other words, the failure prediction module 240 could obtain a corresponding adjustment function according to the recipe types, and calculate the predictive value of health indicator according to the prediction function of health indicator. In step S360, the failure prediction module 240 determine whether the predictive value of health indicator is greater than a threshold health indicator or not. In step S360, when the predictive value of health indicator is greater than the threshold health indicator, replacing the component is determined in step S370. In step S360, when the predictive value of health indicator is not greater than the threshold health indicator, without replacing the component is determined in step S380. Or alternatively, the operation run index value i could be calculated according to the prediction function of health indicator while the predictive value of health indicator is greater than a threshold health indicator. This is to predict in which operation run the component needs to be replaced owing to possible malfunctions. Thus, the status of the component could be estimated effectively, and the health of the processing apparatus could be predicted more precisely.

The life cycle of the component could be predicted by finding out the regressive characteristic function and the adjustment function corresponding to the component and the multiple recipe types. With considering multiple recipe types, the predictive value of health indicator calculated by the prediction function of health indicator could be adapted to the production trend of small volume but with multiple product types. Under the situation of multiple recipe types, the ability of predicting the failure of the component of the processing apparatus could be improved by considering the influence of the multiple recipe types to the value of the health indicator, and the prediction accuracy rate of the component of the processing apparatus could be improved, too. For other heterogeneous data, the active life of the component could be estimated according to the regressive characteristic function and the adjustment function corresponding to the component and the multiple heterogeneous data. With considering multiple heterogeneous data, the predictive value of health indicator calculated by the prediction function of health indicator, the failure prediction of the component could be more effectively, and the prediction accuracy rate of the component of the processing apparatus could also be improved.

The disclosed prognostic method and prognostic apparatus could be adapted to a processing apparatus having a product trend of small volume but with multiple product types. Under the situation of multiple recipe types, the ability of predicting the failure of the component of the processing apparatus could be improved by considering the influence of multiple recipe types to the value of the health indicator.

The specification has described a prognostic method and a prognostic apparatus, for a processing apparatus. The illustrated steps are set out to explain the exemplary embodiments shown, and it should be anticipated that ongoing technological development will change the manner in which particular functions are performed. Thus, these examples are presented herein for illustration only, but not limitation. For example, steps or processes disclosed herein are not limited to being performed in the order described, but may be performed in any order, and some steps may be omitted, consistent with disclosed embodiments. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

It will be apparent to those skilled in the art that various modifications and variations can be made to the disclosure. It is intended that the specification and examples be considered as exemplary embodiments only, with a scope of the disclosure being indicated by the following claims and their equivalents.

What is claimed is:

1. A prognostic method for a component of a processing apparatus, comprising:
    obtaining multiple sensor data of a component of the processing apparatus and a heterogeneous data of the processing apparatus;
    obtaining multiple health indicators of the component according to the multiple sensor data;
    obtaining a regressive characteristic function and an adjustment function according to the multiple health indicators and the heterogeneous data, wherein the adjustment function corresponds to the heterogeneous data;
    obtaining a prediction function of health indicator according to the regressive characteristic function and the adjustment function; and
    obtaining a predictive value of health indicator according to the prediction function of health indicator to estimate a usage status of the component;

wherein the component is a particle filter, and the sensor data are sensed and recorded by a sensor of the particle filter.

2. The method of claim 1, further comprising:
determining whether the predictive value of health indicator is greater than a threshold health indicator or not; and
replacing the component when the predictive value of health indicator is greater than the threshold health indicator.

3. The method of claim 1, wherein obtaining the regressive characteristic function and the adjustment function includes:
the multiple health indicators correspond to multiple runs, respectively, the multiple runs correspond to multiple operation run index values, respectively, and for each of the multiple operation run index values, the regressive characteristic function and the adjustment function minimize an error between the prediction function of health indicator and an health indicator value corresponding to the operation run index value.

4. The method of claim 1, wherein the processing apparatus is a semiconductor processing apparatus, the heterogeneous data includes multiple recipe type data, the multiple sensor data are obtained by the sensor of the component, the multiple recipe type data correspond to multiple recipe types, different recipe types correspond to different processing parameters, and the adjustment function generates different correction values corresponding to the different recipe types.

5. The method of claim 4, wherein the different recipe types correspond to different processing products.

6. The method of claim 4, wherein the different recipe types correspond to different adjustment functions.

7. The method of claim 1, wherein the multiple sensor data correspond to multiple operation runs, each operation run of the multiple operation runs corresponds to at least one of the multiple sensor data, and a corresponding health indicator is obtained according to the at least one of the multiple sensor data of the operation run.

8. The method of claim 1, wherein the regressive characteristic function is a time series model or a curve fitting model.

9. The method of claim 1, wherein the processing apparatus is a Metal Organic Chemical Vapor Deposition (MOCVD) apparatus.

10. The method of claim 1, wherein the heterogeneous data comprises at least one of a product type, a maintenance or repair way, and an operation factor.

11. A prognostic apparatus, comprising:
a data circuit to obtain multiple sensor data of a component of a processing apparatus and a heterogeneous data of the processing apparatus;
a health indicator circuit to obtain multiple health indicators of the component according to the multiple sensor data;
an adjustment circuit to obtain a regressive characteristic function and an adjustment function according to the multiple health indicators and the heterogeneous data, wherein the adjustment function corresponds to the heterogeneous data, and a prediction function of health indicator is obtained according to the regressive characteristic function and the adjustment function; and
a failure prediction circuit to obtain a predictive value of health indicator according to the prediction function of health indicator to estimate a usage status of the component;
wherein the component is a particle filter, and the sensor data are sensed and recorded by a sensor of the particle filter.

12. The apparatus of claim 11, the failure prediction circuit is used to determine whether the predictive value of health indicator is greater to a threshold health indicator or not; and determine whether the component is replaced when the predictive value of health indicator is greater than the threshold health indicator.

13. The apparatus of claim 11, wherein the multiple health indicators correspond to multiple runs respectively, the multiple runs correspond to multiple operation run index values, respectively, and for each of the multiple operation run index values, the regressive characteristic function and the adjustment function minimize an error between the prediction function of health indicator and an health indicator value corresponding to the operation run index value.

14. The apparatus of claim 11, wherein the processing apparatus is a semiconductor processing apparatus, the heterogeneous data includes multiple recipe type data, the multiple sensor data are obtained by the sensor of the component, the multiple recipes type data correspond to multiple recipe types, different recipe type corresponds to different processing parameters, and the adjustment function generates different correction values corresponding to the different recipe types.

15. The apparatus of claim 14, wherein the different recipe types correspond to different processing products.

16. The method of claim 14, wherein the different recipe types correspond to different adjustment functions.

17. The apparatus of claim 11, wherein the multiple sensor data correspond to multiple operation runs, each operation run of the multiple operation runs corresponds to at least one of the multiple sensor data, and a corresponding health indicator is obtained according to the at least one of the multiple sensor data of the operation run.

18. The apparatus of claim 11, wherein the regressive characteristic function is a time series model or a curve fitting model.

19. The apparatus of claim 11, wherein the processing apparatus is a Metal Organic Chemical Vapor Deposition (MOCVD) apparatus.

20. The apparatus of claim 11, wherein the heterogeneous data comprises at least one of a product type, a maintenance or repair way, and an operation factor.

* * * * *